(12) United States Patent
Schulnig et al.

(10) Patent No.: US 10,669,107 B2
(45) Date of Patent: Jun. 2, 2020

(54) CARRYING APPARATUS AND CAM CONTROL SHAFT FOR GRIPPING DEVICES

(71) Applicant: TYROLON-SCHULNIG GMBH, Hochifilzen (AT)

(72) Inventors: Elmar Schulnig, Fieberbrunn (AT); Ludwig Schulnig, St. Jakob in Haus (AT)

(73) Assignee: TYROLON-SCHULNIG GMBH, Hochfilzen (AT)

( * ) Notice: Subject to any disclaimer, the term of this patent is extended or adjusted under 35 U.S.C. 154(b) by 0 days.

(21) Appl. No.: 16/485,163

(22) PCT Filed: Oct. 26, 2017

(86) PCT No.: PCT/EP2017/077388
§ 371 (c)(1),
(2) Date: Aug. 11, 2019

(87) PCT Pub. No.: WO2018/162096
PCT Pub. Date: Sep. 13, 2018

(65) Prior Publication Data
US 2020/0039761 A1 Feb. 6, 2020

(30) Foreign Application Priority Data

Mar. 9, 2017 (DE) .......................... 10 2017 105 015
Mar. 9, 2017 (DE) .......................... 10 2017 105 016

(51) Int. Cl.
*B65G 47/86* (2006.01)
*B65G 47/84* (2006.01)
(52) U.S. Cl.
CPC ........... *B65G 47/847* (2013.01); *B65G 47/84* (2013.01); *B65G 2201/0235* (2013.01)

(58) Field of Classification Search
CPC ................ B65G 47/846; B65G 47/847; B65G 2201/0235; B65G 2201/0244
(Continued)

(56) References Cited

U.S. PATENT DOCUMENTS 3,967,847 A * 7/1976 Ellis ........................ B08B 9/426
294/116
4,381,056 A * 4/1983 Eberle ................... B65H 29/003
198/803.7
(Continued)

FOREIGN PATENT DOCUMENTS

CN        102990560 A     3/2013
CN        101885418 B     8/2014
(Continued)

OTHER PUBLICATIONS

EP 0794413 A2, now U.S. Pat. No. 5,831,222 A.
(Continued)

*Primary Examiner* — James R Bidwell
(74) *Attorney, Agent, or Firm* — Brooks Kushman P.C.

(57) ABSTRACT

A supporting device for receiving, securing, and supporting at least one gripping mechanism comprises at least one gripper arm pair of a first and second gripper arm for gripping, holding, and guiding containers, a circular or circular-segmented support plate including a first receiving opening to accommodate and secure a first gripper arm pivot axis, a second receiving opening to accommodate and secure a second gripper arm pivot axis, and a third receiving opening to rotatably receive a cam control shaft for opening or closing the gripping mechanism configured for each gripping mechanism in the axial direction, and a fourth receiving opening to receive and fix a locking pin to rotatably secure the cam control shaft for each gripping mechanism, the fourth receiving opening extending inwardly from
(Continued)

an outer lateral surface of the support plate toward the third receiving opening and at least partly projecting into same.

12 Claims, 6 Drawing Sheets

(58) Field of Classification Search
USPC ........ 198/469.1, 470.1, 478.1, 867.07, 803.9
See application file for complete search history.

(56) References Cited

U.S. PATENT DOCUMENTS

| | | | |
|---|---|---|---|
| 4,722,432 A | 2/1988 | Staton | |
| 4,850,823 A | 7/1989 | Guentert et al. | |
| 5,743,377 A * | 4/1998 | Kronseder | B65G 47/847 |
| | | | 198/470.1 |
| 5,831,222 A | 11/1998 | Fanger et al. | |
| 5,893,700 A * | 4/1999 | Kronseder | B08B 9/426 |
| | | | 198/803.9 |
| 8,833,824 B2 * | 9/2014 | Fahldieck | B65G 47/847 |
| | | | 294/90 |
| 9,181,043 B1 | 11/2015 | Goudy et al. | |
| 9,731,911 B2 * | 8/2017 | Fahldieck | B65G 47/846 |
| 2002/0092731 A1 * | 7/2002 | Osterfeld | B25B 5/147 |
| | | | 198/470.1 |
| 2010/0314220 A1 * | 12/2010 | Fenile | B65H 29/003 |
| | | | 198/470.1 |
| 2011/0114454 A1 | 5/2011 | Balzarin et al. | |
| 2012/0118706 A1 * | 5/2012 | Schulnig | B65G 47/847 |
| | | | 198/803.3 |
| 2017/0173843 A1 * | 6/2017 | Leroux | B65G 47/847 |

FOREIGN PATENT DOCUMENTS

| | | |
|---|---|---|
| DE | 1084640 B | 6/1960 |
| DE | 19903319 A1 | 8/1999 |
| DE | 102015114567 A1 | 3/2017 |
| EP | 0183611 A2 | 6/1986 |
| EP | 0794413 A2 | 9/1997 |
| EP | 2159172 A1 | 3/2010 |

OTHER PUBLICATIONS

CN 101885418, Espace English Abstract.
DE 1084640 B, Machine Translation.
EP 2159172, Espace English Abstract.
CN 102990560, Machine translation.
DE 19903319, Espace English Abstract.
DE 102015114567, Espace English Abstract.
ISR PCT/EP2017/077388, dated Jan. 23, 2018, 14 pages.
DE Office Action corresponding to DE 10 2017 105 015.9, dated Oct. 18, 2017.

* cited by examiner

CARRYING APPARATUS AND CAM CONTROL SHAFT FOR GRIPPING DEVICES

CROSS-REFERENCE TO RELATED APPLICATION

This application is the U.S. national phase of PCT Application No. PCT/EP2017/077388 filed on Oct. 26, 2017, which claims priority to DE Patent Application No. 10 2017 105 015.9 filed on Mar. 9, 2017 and DE Patent Application No. 10 2017 105 016.7 filed Mar. 9, 2017, the disclosures of which are incorporated in their entirety by reference herein.

TECHNICAL FIELD

The present invention relates to a support ring and a cam control shaft for gripping mechanisms.

BACKGROUND

Supporting devices for gripping, holding and/or guiding containers are already known from the prior art, in particular being known as "clamping stars." They are primarily used in the production line processing of containers or receptacles in particular intended to be filled with liquids or other bulk material.

Supporting devices are used among other things during a process of cleaning, filling and labeling containers in which the supporting devices must be locally positioned and aligned in order to receive the containers from the conveyor belts and transport them to the next work station such as, for example, a filling, cleaning or labeling unit. To that end, the supporting devices comprise gripping mechanisms for gripping, holding and/or guiding in particular bottle-like containers. Such a gripping mechanism has at least one gripper arm pair consisting of two gripper arms and can switch between a gripping position and an open position. In order to transport a container, the gripper arms normally grasp underneath the collar or around the mid-section of the container. A cam control shaft thereby functions as opening means and a spiral spring or a pair of magnets, for example, as closure means for the gripping mechanism or vice versa. The cam control shaft of the gripping mechanism is thereby driven by an actuating means, via which the gripping mechanism can be opened and closed.

The gripping mechanisms are normally concentrically positioned and fixed on a circular support ring around the driving axle or drive shaft respectively of the supporting device. This thereby ensures that after a certain rotational movement of the support ring, the same or another gripping mechanism ends up at the same position again or at a predetermined position at which the gripping mechanism stably grips or again releases a container to be transported. Depending on, inter alia, the size of the support ring, in particular its radius, a maximum number of gripping mechanisms can be fixed on the support ring. It is thereby self-evident that the support ring can also be formed in one or more pieces as a support plate. The number of gripping mechanisms on the support ring likewise depends both on the size of the gripping mechanisms themselves as well as the size of the containers to be transported.

Among that required in order to adapt the supporting devices to new operating conditions such as, for example, new equipment or containers of differing shape and/or size, is changing or respectively replacing the number or type of gripping mechanisms. Known from the prior art is for the gripping mechanisms to comprise a base pedestal with three recesses, in which two pivot axes for both gripper arms as well as a rotatably mounted cam control shaft are arranged, whereby the base pedestal is mountable or mounted on a support ring. The advantage thereby achieved consists of a compact gripping mechanism which can be removed from the support ring or respectively positioned on and secured to the support ring during gripping mechanism replacement without expending an excessive amount of time.

In the situations specified above in which the gripper arms need to be replaced, the systems are stopped and the respective gripper arms are replaced manually.

Such interruptions of operation negatively impact the economic viability of the systems and thus should be as brief as possible.

Also proving to be a disadvantage is that the known prior art gripping mechanisms are difficult to clean. Particularly when filling containers with foodstuffs or pharmaceuticals, very high cleanliness needs to be heeded which can only be achieved in the prior art by frequent cleaning intervals, these usually needing to be at least to some extent performed manually.

SUMMARY

It is thus the task of the present invention to design a supporting device and a cam control shaft for gripping mechanisms which allow quick and simple mounting of the gripping mechanisms as well as minimize contact surfaces for dirt.

The invention solves this task with a supporting device in accordance with claim 1. Accordingly, a supporting device is provided for receiving, securing and supporting at least one gripping mechanism comprising at least one gripper arm pair of a first and a second gripper arm for gripping, holding and guiding containers as well as a circular or circular-segmented support ring, in which a first receiving opening for accommodating and securing a first gripper arm pivot axis of the first gripper arm, a second receiving opening for accommodating and securing a second gripper arm pivot axis of the second gripper arm, a third receiving opening for the rotatable receiving of a cam control shaft for opening or closing the gripping mechanism, and a fourth receiving opening for each gripping mechanism for receiving and fixing a locking pin for the rotatable securing of the cam control shaft is respectively provided for each gripping mechanism in the axial direction, wherein the fourth receiving opening extends inwardly from the outer lateral surface or the outer edge respectively of the support ring toward the third receiving opening and at least partly projects into same.

To be understood by the term "container" in the context of the present invention is in particular containers and/or receptacles for receiving or respectively transporting liquids or other bulk material. Various types of containers can differ in, among other things, their shape, their maximum filling capacity and their material such as glass, plastic or metal.

Understood by the term "support ring" in the context of the present invention is in particular, but not exclusively, a circular or circular-segmented plate or ring having a radius which is a multiple of the plate/ring thickness. Such a support ring can consist for example of metal, steel, aluminum or an alloy. A support ring made from a plastic is also possible.

Understood by the term "locking pin" in the context of the present invention is in particular, but not exclusively, a rod-shaped component such as, for example, a standard screw, an internal hexagon socket head screw, or a set screw with a hexagon socket head or the like.

One advantage of a supporting device configured as such is that no separate base pedestal is necessary for a gripping mechanism which accommodates, positions and fixes the pivot axes and control shaft. The cam control shaft can also be replaced quickly and with little maintenance via the fourth receiving opening and the locking pin therein rotatably securing it. A further advantage consists of the cam control shaft being able to be fixed by the locking pin situated in the fourth receiving opening without any negative impact to its rotation.

In a further embodiment, the fourth receiving opening exhibits an internal thread for the securing of a locking pin provided with an external thread. This thus yields the advantage of the locking pin being positively connected to the fourth receiving opening and maintaining the desired position and functionality even upon vibratory forces.

The fourth receiving opening preferably runs as a tangential cut through the boundary region of the third receiving opening so that a locking pin introduced into the fourth receiving opening tangentially intersects the third receiving opening. A fourth receiving opening positioned as such can achieve a further improved rotatable securing of the cam control shaft by the cam control shaft having a tangential groove in an appropriate location. By means of the fourth receiving opening being configured in this manner, a very easy and fast mounting/dismounting of the cam control shaft is ensured.

According to a further embodiment, the fourth receiving opening radially extends inwardly from the outer lateral surface of the support ring toward the third receiving opening and at least partly projects into same radially. In this case, the cam control shaft would exhibit an at least partially formed annular groove in an appropriate location which is just as long as required by the back and forth rotating of the cam control shaft when the end of a locking pin introduced into the fourth receiving opening projects into said annular groove in the installed state of the cam control shaft. The fourth receiving opening configured as such also ensures a very easy and fast mounting/dismounting of the cam control shaft, which greatly reduces maintenance intervals and the associated downtimes of the supporting device or the entire system respectively.

The task underlying the invention is also inventively solved by a cam control shaft for use in a supporting device according to one of the preceding embodiments which comprises a rod-shaped upper section, a cylindrical center section, and a base section configured as a control cam for opening or closing the gripping mechanism, wherein the cylindrical center section exhibits a tangential groove or a partially formed annular groove.

The advantages of the supporting device explained above are likewise achieved by the cam control shaft according to the invention. Additionally thereto, the inventive cam control shaft is considerably easier to clean due to the rod-shaped upper section, whereby this can also be realized automatically, for example by means of spray nozzles.

Likewise having proven advantageous is for the rod-shaped upper section to comprise a head section, the diameter of which is less than that of the rod-shaped upper section. This thereby creates a space in the third receiving opening between its inner edge and the head section as only one gap between the inner edge of the third receiving opening and the outer circumference of the head section which is more easily accessed from the outside, e.g. by spray nozzles, making it easier to keep clean.

One advantageous embodiment of the inventive cam control shaft can consist of the rod-shaped upper section and the center section being able to be connected by plugging into each other. This embodiment achieves a modular cam control shaft in which defective components can be replaced without needing to dispose of the entire cam control shaft. A standard center section can likewise be connected to upper sections of different lengths in order to thus be able to meet different requirements in terms of the length of the cam control shaft as a whole without needing to keep sets of cam control shafts of differing lengths on hand for that purpose. This thereby both saves on production costs, storage costs and also disposal costs as well as reduces the amount of waste in production.

In a further advantageous embodiment, the rod-shaped upper section, the cylindrical center section and the base section are integrally formed. An embodiment configured as such has the advantage of being able to be economically manufactured by known prior art injection molding processes. Moreover, this embodiment increases the stability of the cam control shaft.

The rod-shaped upper section is advantageously of biconcave configuration in cross section and has a smaller diameter than the cylindrical center section. One advantage of this embodiment is again the facilitated cleaning capability. It is thus for example possible for a cleaning nozzle located in the vicinity of the head section to directly dispense the cleaning agent toward the base section via the head section.

Likewise having proven advantageous is the cylindrical center section being of a height corresponding to the axial thickness of the support ring. Such a height thereby achieves a form-fitting and exact structure, whereby the amount of material used to produce the cam control shaft is optimized and the cleaning of the cam control shaft support as well as the cam control shaft itself is even further facilitated since contamination due to infiltration into the area between the cam control shaft and the support ring is largely deterred.

The initially posed task is also solved by an inventive method for inserting a cam control shaft according to one of the preceding embodiments into one of the previous supporting devices. The cam control shaft is thereby inserted into the third receiving opening from below so that the cylindrical center section is accommodated in the third receiving opening such that the fourth receiving opening aligns with the tangential groove of the cylindrical center section or points toward the partially formed annular groove, whereupon the locking pin is introduced and screwed into the fourth receiving opening and the tangential groove or annular groove of the cylindrical center section respectively.

The inventive method realizes the advantages of the cam control shaft and the supporting device. Having proven to be a great advantage is the inventive method achieving a faster, easier and at the same time more secure mounting of the cam control shaft.

The underlying task of the invention is also solved by a transporting device having a supporting device according to one of the preceding embodiments which comprises at least one gripping mechanism for the gripping, holding and guiding of containers and a cam control shaft according to one of the preceding embodiments. Such a transporting device realizes the advantages of the cam control shaft. In particular, a transporting device configured as such is easier to clean, for example using pressure nozzles, and the replacing of gripping mechanisms is considerably facilitated.

Further specifics and advantages of the invention will be described in greater detail on the basis of a number of preferential exemplary embodiments as depicted in the drawings. Shown are:

DETAILED DESCRIPTION

Figure 1:
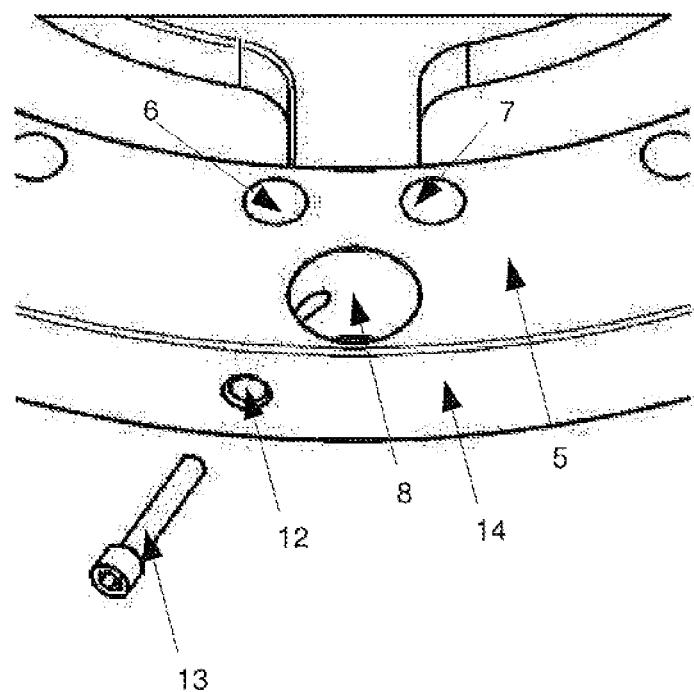
FIG. 1 a segment of a support ring with a fourth receiving opening.

FIG. 1 shows a segment of a support ring with a fourth receiving opening according to the present invention. The support ring 5 has a first receiving opening 6, a second receiving opening 7 and a third receiving opening 8. The side surface with the fourth receiving opening 12 is termed the outer lateral surface 14 or outer edge of the support ring 5. Schematically perceivable in FIG. 1 is that the fourth receiving opening 12 has an internal thread. The fourth receiving opening 12 extends inwardly from the outer lateral surface 14 of the support ring 5 toward the third receiving opening 8 and at least partially projects into same. "At least partially" hereby means that the fourth receiving opening 12 extending inwardly from the outer lateral surface 14 of the support ring 5 either tangentially intersects the third receiving opening 8 or else can protrude radially into said third receiving opening 8.

Figure 2:
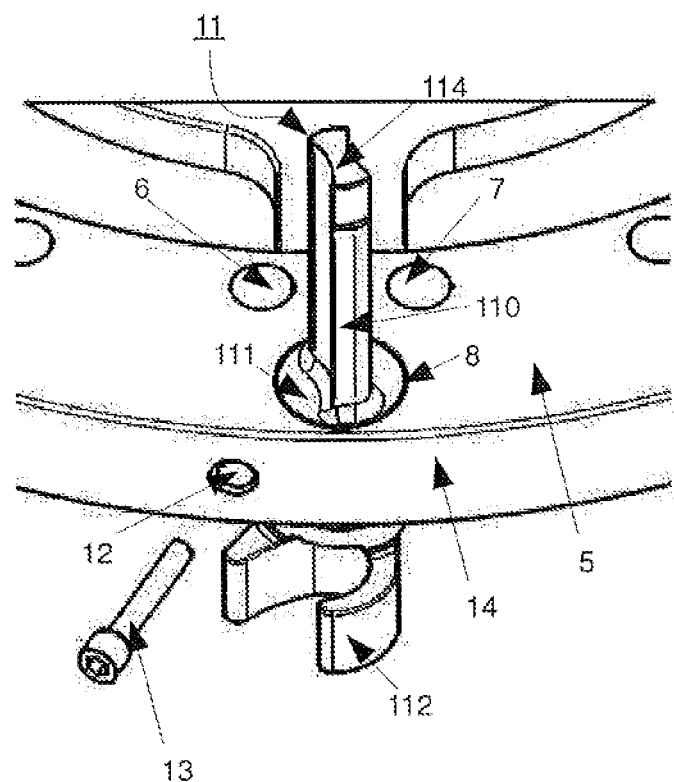
FIG. 2 the segment of the support ring of FIG. 1 with an inserted cam control shaft.

FIG. 2 shows the segment of the support ring of FIG. 1 with an inserted cam control shaft 11 according to the present invention. The cam control shaft 11 is inserted into the support ring 5 such that the cylindrical center section 111, which has a height corresponding to the axial thickness of the support ring 5, forms a closed or at least partially closed surface with same. Joined to the cylindrical center section 111 of the cam control shaft are an upper section 110 as well as a base section 112, wherein the latter exhibits for example a pliers-like form as known per se. The cam control shaft 11 comprises a tangential groove 113 in the area of the cylindrical center section 111 which is not depicted in FIG. 2 (although compare FIGS. 4a and 4b). A locking pin 13 at least partially exhibiting an external thread 15, which is form-fitting with the internal thread of the fourth receiving opening 12, is pushed into this tangential groove 113 through the fourth receiving opening 12. The locking pin 13 can for example be a standard screw, an internal hexagon socket head screw, or a set screw with hexagon socket head. It is obvious that other components able to fulfill this function are also possible for the locking pin 13. Moreover, alternatively to the tangential groove 113, the center section 111 of the cam control shaft 11 can also exhibit a (not depicted) partially formed annular groove into which the locking pin then projects radially. The length of the annular groove is then to be dimensioned so as to allow the back and forth rotation of the cam control shaft 11 required to open and close a gripping mechanism with the locking pin projecting into it but prevent the cam control shaft 11 from falling out of the third receiving opening 8. However the alternative with the tangential groove 113 is to be preferred because of the larger guide surface between the locking pin and groove compared to a locking pin radially engaging in a partial annular groove.

In the depicted figure, the upper section 110 of the cam control shaft is rod-shaped, biconcave in cross section, and exhibits a smaller diameter than the cylindrical center section 110. It also comprises a head section 114, the diameter of which is less than that of the rod-shaped upper section 110.

Figure 3:
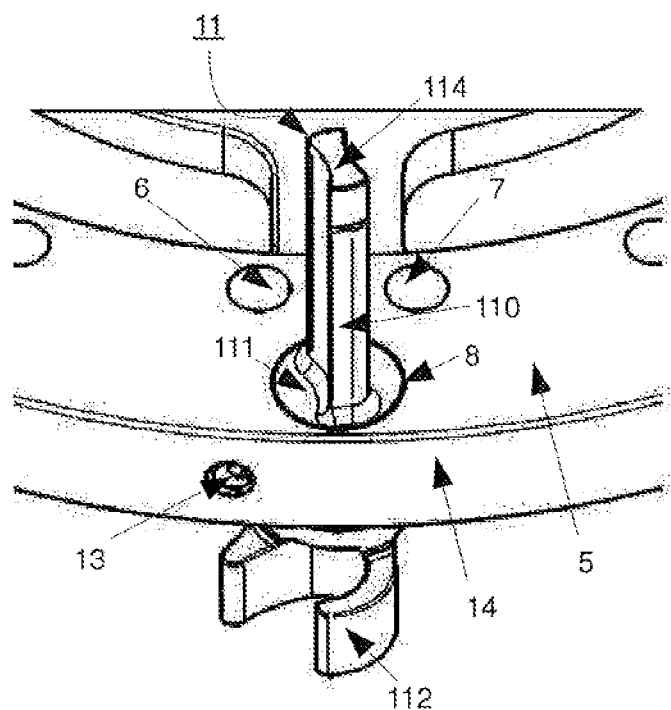
FIG. 3 the segment of the support ring of FIG. 2 with a fixed cam control shaft.

FIG. 3 shows the segment of the support ring of FIG. 2, wherein the cam control shaft is rotatably fixed by means of the locking pin 13. The cam control shaft 11 is rotatably fixed by means of the locking pin 13, whereby the installed locking pin 13 accommodated in the fourth receiving opening 12 is not visible. In order to mount, the cam control shaft 11 is inserted into the third receiving opening 8 from below so that the cylindrical center section 111 is received in the third receiving opening 8 in such a manner that the fourth receiving opening 12 aligns with the tangential groove 113 of the cylindrical center section 111, whereupon the locking pin 13 is introduced and screwed into the fourth receiving opening 12 and the tangential groove 113 of the cylindrical center section 111.

Figure 4A:
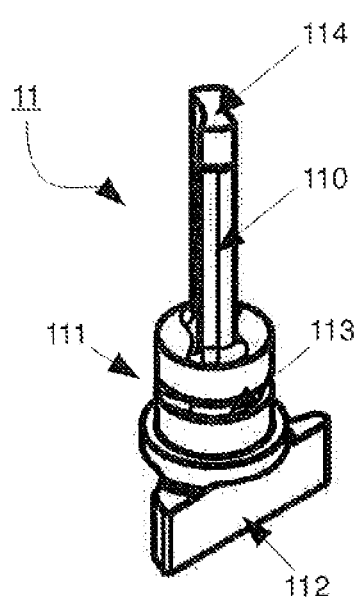
FIG. 4a a detail view of the cam control shaft according to one embodiment.

FIG. 4a shows a detail view of the cam control shaft according to one embodiment of the invention. This cam control shaft 11 comprises a rod-shaped upper section 110, a cylindrical center section 111, and a base section 112 configured as a control cam for opening or closing the gripping mechanism 2. The cylindrical center section 111 of the control cam 11 also exhibits a tangential groove 113. The rod-shaped upper section 110 comprises a head section 114, the diameter of which is less than that of the rod-shaped upper section 110.

Figure 4B:
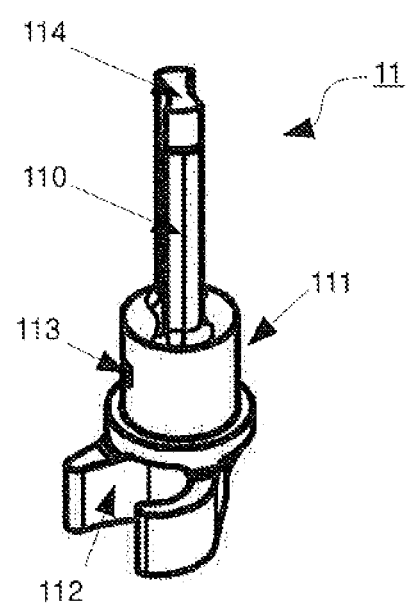
FIG. 4b the cam control shaft of FIG. 4a from another perspective.

FIG. 4b shows the cam control shaft 11 of FIG. 4a from another perspective, whereby particularly the pliers-like form to the base section 112 can be recognized. It can also be seen that the tangential groove 113 does not extend completely around the circumference of the cylindrical center section 111 of the cam control shaft but rather in only one radial portion thereof.

Figure 5:
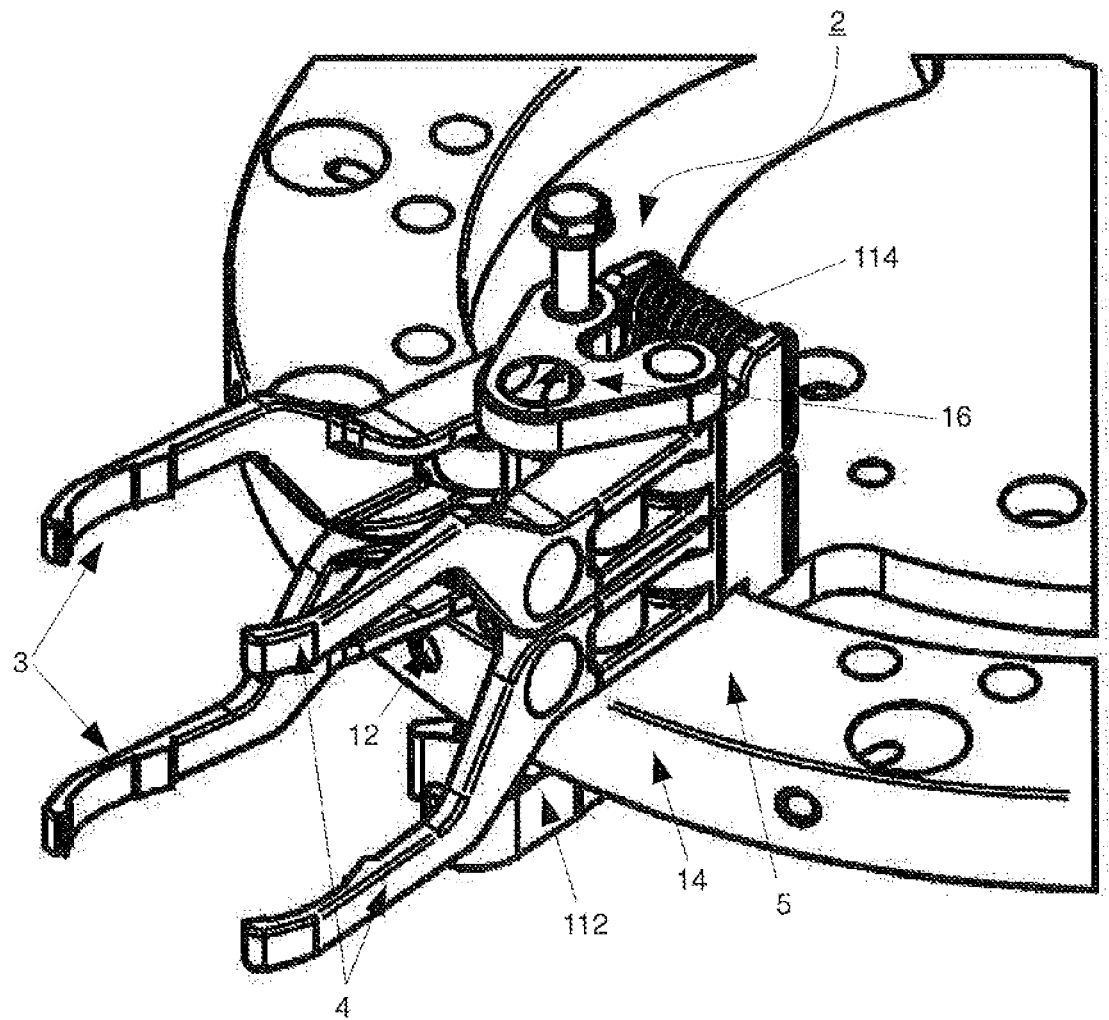
FIG. 5 a segment of the transporting device with mounted gripping mechanism and cam control shaft.

FIG. 5 shows a segment of the transporting device with a mounted gripping mechanism and a cam control shaft. The gripping mechanism 2 is in an half-opened state, as can be recognized by the position of the first and second gripper arm 3, 4. Most of the cam control shaft 11 is obscured by the gripping mechanism 2. Although it can be seen that the head section 114 of the cam control shaft 11 fits flat with the upper part of the counter bearing 16. This is enabled by the appropriate height to the head section 114. The advantage of at least two gaps remaining open between the upper part of the counter bearing 16 and the head section 114 due to the form of the head section 114 of the cam control shaft 11, through which the gripping mechanism 2 or the cam control shaft 11 respectively can be cleaned, for example by means of nozzles (not depicted), is also clearly visible.

Figure 6:
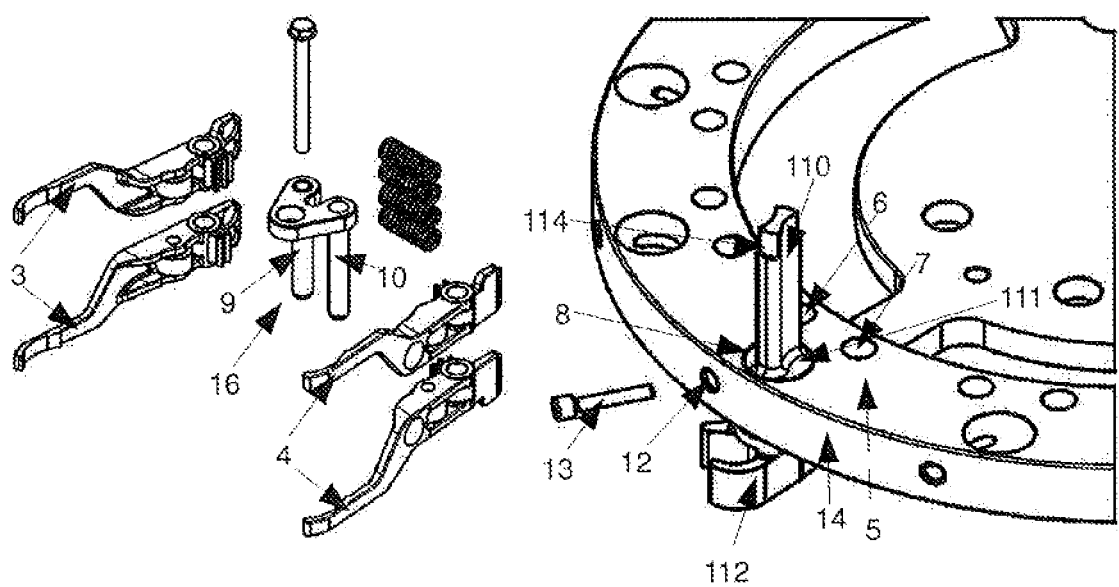
FIG. 6 a partially exploded view of the transporting device segment of FIG. 5.

FIG. 6 shows the segment of the inventive transporting device of FIG. 5 in a partially exploded view. The gripping mechanism 2 is depicted in exploded view and comprises a gripper arm pair of a first and second gripper arm 3, 4 for gripping, holding and guiding containers. The depicted segment of the transporting device also shows a circular-segmented support ring 5, in which a first receiving opening 6 for accommodating and securing a first gripper arm pivot axis 9 of the first gripper arm 3, a second receiving opening 7 for accommodating and securing a second gripper arm pivot axis 10 of the second gripper arm, and a third receiving opening 8 for the rotatable receiving of a cam control shaft 11 for opening or closing the gripping mechanism 2 is configured for each gripping mechanism 2 in the respective axial direction. The support ring 5 also comprises a fourth receiving opening 12 for each gripping mechanism 2 for receiving and fixing a locking pin 13 for the rotatable securing of the cam control shaft 11, wherein the fourth receiving opening 12 extends inwardly from the outer lateral surface or the outer edge 14 respectively of the support ring 5 toward the third receiving opening 8 and at least partly projects into same. FIG. 5 does not depict the exact course of the fourth receiving opening 12. It is thus for example also possible for the fourth receiving opening 12 to run through the edge region of the third receiving opening 8 in the form of a tangential cut so that a locking pin 13 introduced into the fourth receiving opening 12 tangentially intersects the third receiving opening 8. It is also possible for the fourth receiving opening 12 to radially extend inwardly from the outer lateral surface or the outer edge 14 respectively of the support ring 5 to the third receiving opening 8 and partly project radially into same. In the present figure, the depicted locking pin 13 is a set screw with a hexagon socket head having an external thread at least on the hexagon socket head. The depicted counter bearing 16 of the gripping mechanism 2 is configured such that the respective gripper arm pivot axes 9, 10 can be mounted in the first or respectively second receiving opening 6, 7. The head section 14 of the cam control shaft 11 is of biconcave configuration in cross section like the rod-shaped upper section 110 is and exhibits a smaller diameter than same.

LIST OF REFERENCE NUMERALS 2 gripping mechanism
3 first gripper arm
4 second gripper arm
5 support ring
6 first receiving opening
7 second receiving opening
8 third receiving opening
9 first gripper arm pivot axis
10 second gripper arm pivot axis
11 cam control shaft
12 fourth receiving opening
13 locking pin
14 outer lateral surface
15 external thread
16 counter bearing
110 upper section
111 cylindrical center section
112 base section
113 tangential groove
114 head section

The invention claimed is:

1. A supporting device for receiving, securing and supporting at least one gripping mechanism comprising at least one gripper arm pair of a first and a second gripper arm for gripping, holding and guiding containers which has a circular or circular-segmented support plate in which a first receiving opening for accommodating and securing a first gripper arm pivot axis of the first gripper arm, a second receiving opening for accommodating and securing a second gripper arm pivot axis of the second gripper arm and a third receiving opening for the rotatable receiving of a cam control shaft for opening or closing the gripping mechanism is respectively formed for each gripping mechanism in the axial direction, wherein
a fourth receiving opening for receiving and fixing a locking pin for the rotatable securing of the cam control shaft is provided in the support plate for each gripping mechanism, wherein the fourth receiving opening extends inwardly from the outer lateral surface of the support plate toward the third receiving opening and at least partly projects into same.

2. The supporting device of claim 1, wherein
the fourth receiving opening exhibits an internal thread for the securing of a locking pin provided with an external thread.

3. The supporting device of claim 1, wherein
the fourth receiving opening runs as a tangential cut through a boundary region of the third receiving opening so that a locking pin introduced into the fourth receiving opening tangentially intersects the third receiving opening.

4. The supporting device of claim 1, wherein
the fourth receiving opening radially extends inwardly from an outer lateral surface of the support plate toward the third receiving opening and partly projects into same radially.

5. A cam control shaft for use in a supporting device of claim 1, comprising a rod-shaped upper section, a cylindrical center section, and a base section configured as a control cam for opening or closing the gripping mechanism, wherein
the cylindrical center section exhibits a tangential groove or a partially formed annular groove.

6. The cam control shaft of claim 5, wherein
the rod-shaped upper section comprises a head section, the diameter of which is less than that of the rod-shaped upper section.

7. The cam control shaft of claim 5, wherein
the rod-shaped upper section and the center section are connectable by plugging into each other.

8. The cam control shaft of claim 5, wherein
the rod-shaped upper section, the cylindrical center section and the base section are integrally formed.

9. The cam control shaft of claim 5, wherein
the rod-shaped upper section is of biconcave configuration in cross section and has a smaller diameter than the cylindrical center section.

10. The cam control shaft of claim 5, wherein
the cylindrical center section has a height which corresponds to an axial thickness of the support plate.

11. A method for inserting a cam control shaft of claim 5, into a supporting device, wherein
the cam control shaft is inserted into the third receiving opening from below so that the cylindrical center section is accommodated in the third receiving opening such that fourth receiving opening aligns with the tangential groove of the cylindrical center section or points toward the partially formed annular groove, whereupon the locking pin is introduced and screwed into the fourth receiving opening and the tangential groove or annular groove of the cylindrical center section respectively.

12. A transporting device having a supporting device of claim 1, which comprises at least one gripping mechanism for the gripping, holding and guiding of containers and a cam control shaft comprising a rod-shaped upper section, a cylindrical center section, and a base section configured as a control cam for opening or closing the gripping mechanism, wherein the cylindrical center section exhibits a tangential groove or a partially formed annular groove.

* * * * *